(No Model.)
M. C. BARDEN.
POWDER DISTRIBUTER.
No. 447,175. Patented Feb. 24, 1891.
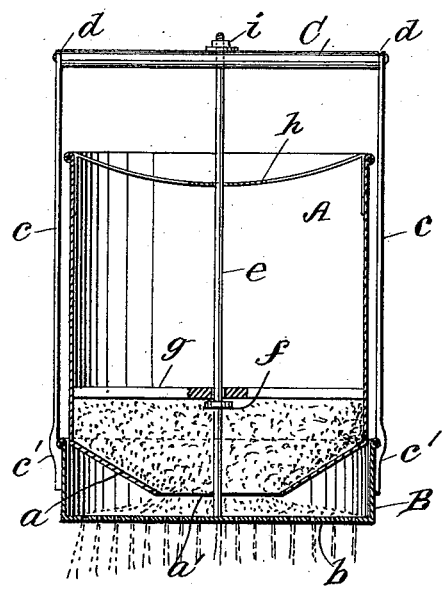
WITNESSES:
F. McArdle
C. Sedgwick
INVENTOR:
M. C. Barden
BY Munn & Co.
ATTORNEYS

UNITED STATES PATENT OFFICE.

MERRITT C. BARDEN, OF WEST PAWLET, VERMONT.

POWDER-DISTRIBUTER.

SPECIFICATION forming part of Letters Patent No. 447,175, dated February 24, 1891.

Application filed July 16, 1890. Serial No. 358,789. (No model.)

*To all whom it may concern:*

Be it known that I, MERRITT C. BARDEN, of West Pawlet, in the county of Rutland and State of Vermont, have invented a new and useful Powder-Distributer, of which the following is a full, clear, and exact description.

This invention relates to an improved device for the even distribution of pulverized plaster-of-paris, stone-dust, and paris-green or other powdered material used as a fertilizer for plants or an insect-exterminator; and has for its object to provide a simple, inexpensive, and practical device which is easy to operate and is efficient in action.

To these ends my invention consists in the construction and combination of parts, as is hereinafter described, and indicated in the claims.

Reference is to be had to the accompanying drawing, forming a portion of this specification, and the letters of reference marked thereon.

The single figure shown is a side elevation of the implement, taken through its axial center.

A is a cylindrical vessel of suitable dimensions for its use, a bottom $a$ being provided for said vessel, which bottom is preferably made dishing in form and is centrally apertured. Concentric with the vessel A a pan B is retained, as will be further explained. As shown, the pan B consists of a cylindrical wall having a flat bottom $b$, that is foraminated, the holes therein formed being of proper size and equal diameter. The relative diameter of the pan B is such that its vertical side wall will loosely embrace the wall of the vessel A when these parts are assembled. To the upper edge of the side walls of the pan B a transverse cylindrical handle-bar C is attached, as shown, by limbs $c$, which extend from the ends $d$ of the handle and are secured to the pan at $c'$.

It is essential that the vessel A and pan B should be retained in concentric adjustment with the apertured bottom $a$ of the vessel, slightly separated from the flat bottom $b$ of the pan, so that pulverized material in the upper chamber or vessel A may be discharged through the aperture $a'$ into the pan.

To effect the proper connection of parts just named, an axial rod $e$ is erected from the center of the flat bottom $b$ and engages and supports the cross-bar $g$, that is attached by its ends to the inner side of the vessel A at such a height from the aperture $a'$ that a sufficient space for escape of powdered material will be afforded between the lowest point of the apertured bottom $a$ and the adjacent foraminated bottom $b$. The upper end of the axial rod $e$ is inserted through and secured in the handle-bar C at its center of length $i$. The rod also passes through a cross-bar $h$ at the upper part of the vessel A.

In operation, the device being supplied with pulverized insecticide, such as paris-green, which may be mixed with stone-dust in proper proportions, the distributer is carried by hand and the contained material evenly sprinkled upon corn, potatoes, or other growing plants for the extermination of insects, vermin, &c., and the supply of fertilizing material to the plants, said operation being effected by successive revoluble movements of the pan B in opposite directions. The vessel A does not revolve, but delivers the powder continuously upon the screen-like bottom $b$, from which it is sifted by the agitation of the pan B.

The point of frictional contact for the charged vessel A being at the collar $f$ no impediment is offered to the action of the implement, as a slight revoluble motion communicated through the handle to the pan B will freely distribute the material by its discharge from the perforations in the bottom of the pan.

Having thus described my invention, what I claim as new, and desire to secure by Letters Patent, is—

1. The combination, with a pan having a cylindrical side wall and a foraminated bottom and a transverse handle for said pan connected thereto by vertical limbs, of a cylindrical vessel having a dished and centrally-apertured bottom and loosely embraced by the limbs of the handle and concentrically pivoted in the pan, substantially as set forth.

2. The combination, with a pan having a cylindrical side wall and a foraminated bottom, a transverse handle for the pan, and two parallel limbs that retain the handle above the pan, of a cylindrical vessel of a less diameter than the pan, having a dished and centrally apertured bottom, a top cross-bar fixed in the cylindrical vessel, having a central vertical perforation, a lower cross-bar secured in the cylindrical vessel, and an axial pivot-rod extending from the cross-handle of the pan down through the top cross-bar of the vessel and having engagement with the lower cross-bar of said vessel, substantially as set forth.

MERRITT C. BARDEN.

Witnesses:
BERTHA BARDEN,
M. EUGENE BARDEN.